(12) United States Patent
Pjesivac-Grbovic et al.

(10) Patent No.: US 9,495,207 B1
(45) Date of Patent: Nov. 15, 2016

(54) CATALOGING DATA SETS FOR REUSE IN PIPELINE APPLICATIONS

(71) Applicant: Google Inc., Mountain View, CA (US)

(72) Inventors: Jelena Pjesivac-Grbovic, Mountain View, CA (US); Kenneth J. Goldman, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 138 days.

(21) Appl. No.: 14/326,953

(22) Filed: Jul. 9, 2014

(51) Int. Cl.
*G06F 9/46* (2006.01)
*G06F 9/48* (2006.01)

(52) U.S. Cl.
CPC .................................. *G06F 9/4881* (2013.01)

(58) Field of Classification Search
None
See application file for complete search history.

(56) References Cited

U.S. PATENT DOCUMENTS

| | | | | |
|---|---|---|---|---|
| 2003/0208533 A1* | 11/2003 | Farquharson | ....... | H04L 41/5003 709/203 |
| 2011/0099152 A1* | 4/2011 | Law | .................. | G06F 17/30115 707/689 |
| 2012/0210041 A1* | 8/2012 | Flynn | ...................... | G06F 1/183 711/3 |
| 2014/0089777 A1* | 3/2014 | Roiniotis | ............... | G06Q 50/01 715/234 |
| 2014/0282624 A1* | 9/2014 | Holt | ........................ | G06F 9/542 719/318 |
| 2014/0341827 A1* | 11/2014 | Kwon | ..................... | A61K 8/73 424/62 |

OTHER PUBLICATIONS

Law et al., "A Multi-Threaded Streaming Pipeline Architecture for Large Structured Data Sets," VIS '99 Proceedings of the conference on Visualization '99: celebrating ten years, pp. 225-232, Oct. 1999.
Unknown Author, "Cache dataset," Orfeo ToolBox, publically available before Jul. 9, 2014 [retrieved on Oct. 10, 2014]. Retrieved from the Internet: URL<https://www.orfeo-toolbox.org//CookBook/CookBooksu17.html>, 2 pages.
Unknown Author, "Data Governance & Integration," Hortonworks, publically available before Jul. 9, 2014 [retrieved on Oct. 10, 2014]. Retrieved from the Internet: URL<http://hortonworks.com/innovation/data-management/>, 3 pages.

* cited by examiner

*Primary Examiner* — Diem Cao
(74) *Attorney, Agent, or Firm* — Fish & Richardson P.C.

(57) ABSTRACT

The present disclosure relates to cataloging data sets for reuse in pipeline applications. One example method includes identifying a data set produced by a particular pipeline object included in a first pipeline instance, the first pipeline instance including a plurality of pipeline objects, each pipeline object configured to perform a computation, and the particular pipeline object configured to perform a particular computation; determining a set of metadata for the data set, the set of metadata including identifying information for the data set to identify the data set to pipeline instances separate from the first pipeline instance; and allowing pipeline instances separate from the first pipeline instance to retrieve the data set based at least in part on the set of metadata, wherein the pipeline instances avoid performing the particular computation by using the retrieved data set.

19 Claims, 8 Drawing Sheets

CATALOGING DATA SETS FOR REUSE IN PIPELINE APPLICATIONS

BACKGROUND

Large-scale data processing may include parallel processing, which generally involves performing some operation over each element of a large data set simultaneously. The various operations may be chained together in a data-parallel pipeline to create an efficient mechanism for processing a data set.

SUMMARY

The present disclosure relates to cataloging data sets for reuse in pipeline applications.

In general, one innovative aspect of the subject matter described in this specification can be embodied in methods that include the actions of One example method includes identifying a data set produced by a particular pipeline object included in a first pipeline instance, the first pipeline instance including a plurality of pipeline objects, each pipeline object configured to perform a computation, and the particular pipeline object configured to perform a particular computation; determining a set of metadata for the data set, the set of metadata including identifying information for the data set to identify the data set to pipeline instances separate from the first pipeline instance; and allowing pipeline instances separate from the first pipeline instance to retrieve the data set based at least in part on the set of metadata, wherein the pipeline instances avoid performing the particular computation by using the retrieved data set.

Other embodiments of this aspect include corresponding systems, apparatus, and computer programs, configured to perform the actions of the methods, encoded on computer storage devices.

Particular embodiments of the subject matter described in this specification can be implemented so as to realize one or more of the following advantages. By storing and reusing data sets, including intermediate data sets, produced by individual pipeline objects (e.g., processing stages) within a pipeline, repetition of the computations necessary to produce the data sets may be avoided. Further, by cataloging the data sets so that pipeline objects can identify the particular data sets for possible reuse provides a greater possibility for data reuse than requiring pipeline objects to particularly specify a data set (such as by name). Also, data reuse may be further increased by storing and discovering cached data sets automatically rather than requiring developers to explicitly include such functionality in pipelines. Further, the cataloged data can include execution details that may be used, even after an associated data set is deleted, to make educated choices on how to configure subsequent pipelines, such as, for example, what type of parallelism should be used, what specific configurations (e.g., buffer sizes, number of workers, etc.) should be used, or other choices.

The details of one or more embodiments of the subject matter described in this specification are set forth in the accompanying drawings and the description below. Other features, aspects, and advantages of the subject matter will become apparent from the description, the drawings, and the claims.

DESCRIPTION OF DRAWINGS

Like reference numbers and designations in the various drawings indicate like elements.

DETAILED DESCRIPTION

Pipeline applications rely on sequences of jobs to build and extract data they need. Such applications may read multiple data sources, filter necessary data, and build intermediate data sets to be analyzed by computational pipelines. Often, analysts on the same team use the previously produced data as a starting point and may generate the same intermediate data for different stages in different pipeline applications. To reduce unnecessary computation, teams may decide to run regular jobs to generate intermediate data that can be used for further analysis. By effectively and automatically sharing data sets generated by previous jobs, this unnecessary recomputing can be reduced. Further, data usage patterns for this data can be analyzed to facilitate reuse of data sets between pipeline instances.

The present disclosure relates to cataloging data sets for reuse in pipeline applications, and techniques to avoid recomputation and promote data reuse by storing previously produced data sets for use by later pipeline instances. The data sets may be catalogued according to metadata describing each data set, including identifying information for the data set, a unique name by which the data set can be retrieved, execution details describing an efficient way of parallelizing the processing of the data, or other information. In one example, a data set processed by a first pipeline instance is identified during execution of the instance. A set of metadata for the data set may be determined. The set of metadata may identify the data set to later executing pipeline instances separate from the first pipeline instance so those instances may reuse the data set. The set of metadata may also identify execution details including information regarding the processing of an input data set by the first pipeline instance to produce a particular data, such as a key distribution for the input data set, how the input data set was split by the first pipeline instance, how many records were in each split, how long it took the first pipeline instance to process each split, or other information. The metadata and the data set may be stored to allow later executing pipeline instances to retrieve and use the data set, thereby avoiding the need for these later executing pipeline instances to recompute the data set. The metadata may also include information about the cached data set, such as a key distribution, a set of breakpoints for splitting the cached data set, or other information. This information may be passed by the pipeline object along with the cached data set to a subsequent pipeline object that will process the cached data set. This information can be analyzed by later pipeline instances to determine how to better divide the input data set for processing.

These features and additional features are described in more detail below.

Figure 1:
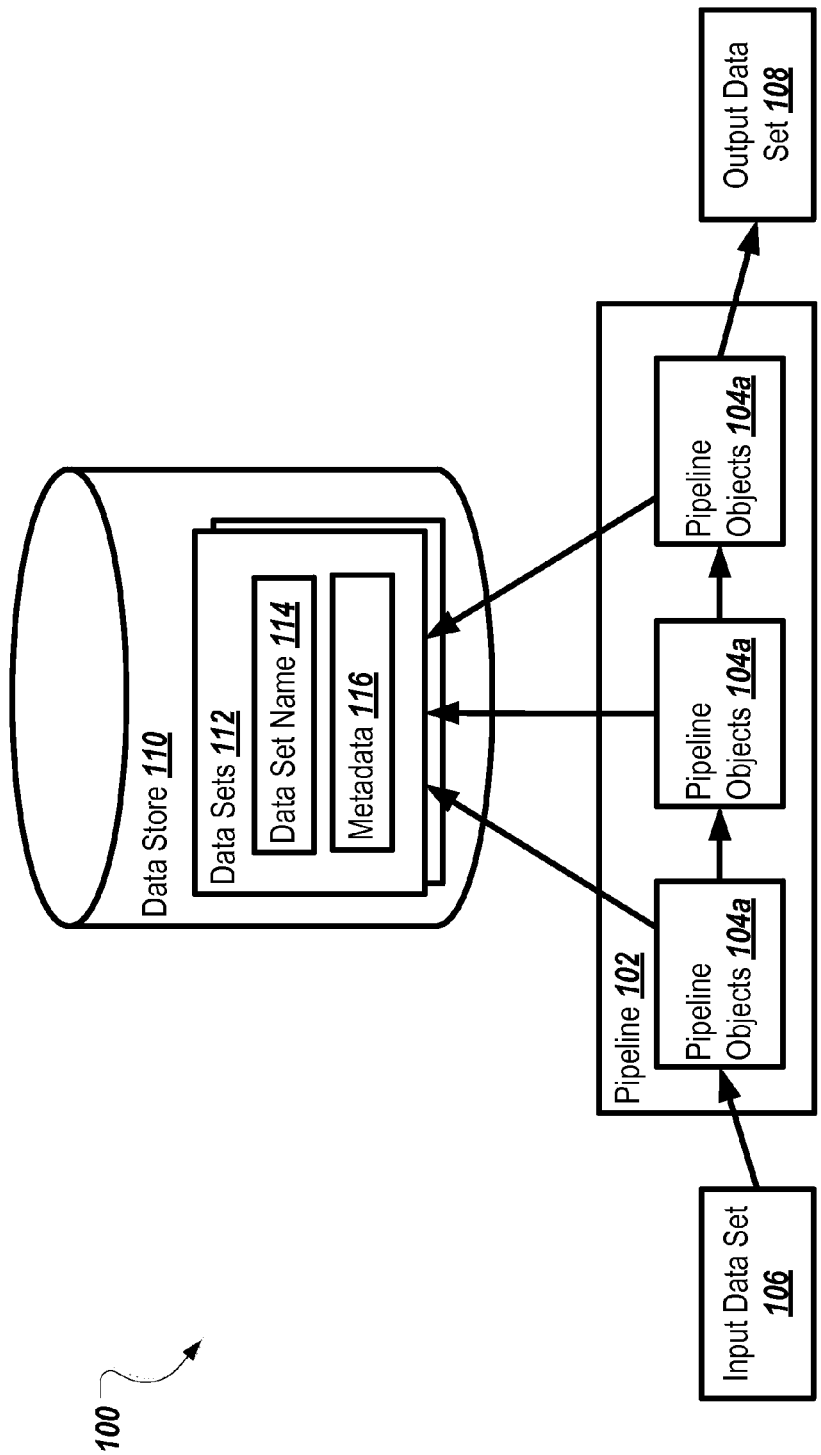
FIG. 1 is a block diagram of an environment in which cataloging data sets for reuse in pipeline applications can occur.

FIG. 1 is a block diagram of an environment 100 in which cataloging data sets for reuse in pipeline applications can occur. Environment 100 includes a pipeline 102 including one or more pipeline objects 104a-c. The pipeline 102 takes an input data set 106 as input and produces an output data set 108 as output. The pipeline 102 is connected to a data store 110. In operation, the pipeline objects 104a-c store data sets 112 in the data store 110. The data sets 112 may also be referred to as cached data sets. The pipeline objects 104a-c store data sets 112 produced by their associated computations, such as intermediate data sets to be provided as input to the next pipeline object in the pipeline 102, or to be provided as output, such as in the case of a final pipeline object in the pipeline 102. The pipeline objects 104a-c may assign each data set 112 a data set name 114, and a set of metadata 116 identifying the data set 112 so it can be retrieved and used by later executing pipeline objects to avoid recomputing the data set 112.

As shown, the environment includes pipeline 102. In some implementations, pipeline 102 is a distributed application operable to perform computations on the input data set 106 and produce the output data set 108. In some cases, the pipeline 102 may be a set of programs executing on one or more servers connected by a network (not shown). The pipeline 102 may include instructions to organize and coordinate execution of the various components of the pipeline 102, such as the pipeline objects 104a-c described below.

As shown, the pipeline 102 includes one or more pipeline objects 104a-c. In some implementations, the pipeline objects 104a-c each perform a computation on an input data set to produce an output data set. In some implementations, the pipeline objects 104a-c may be independent software programs that may be run on separate servers in parallel. The pipeline objects 104a-c may be arranged in an execution order, such that the output of one pipeline object (e.g., 104a) may serve as input to another pipeline object (e.g., 104b). The operation of the pipeline objects 104a-c is discussed in greater detail relative to FIG. 3.

In operation, the pipeline objects 104a-c perform various operations or transformations on the input data set 106 to produce the output data set 108. For example, in a case where the pipeline 102 defines a MapReduce operation, the pipeline object 104a may be a mapper object, the pipeline object 104b may be a shuffler object, and the pipeline object 104c may be a reducer object. The pipeline objects 104a-c may also perform other operations, such as, for example, aggregation, combination, grouping by keys, flattening, joining, counting, removing duplicate items, and other operations.

Environment 100 also includes an input data set 106 to be processed by the pipeline 102. In some implementations, the input data set 106 may be a database table, a text or binary file, a data stream, a collection of data shards, a collection of key value pairs, or another type of data set or combination of types of data sets. In some implementations, the input data set 106 may be received by the pipeline 102, such as over a network or as standard input to a program. The input data set 106 may also be requested or retrieved by the pipeline 102 on startup or incrementally as execution proceeds.

The environment 100 also includes output data set 108. In operation, the output data set 108 is produced by the pipeline 102 by processing the input data set 106. The output data set 108 represents the end product of the pipeline 102. For example, if pipeline 102 defines an operation in which occurrences of each letter within the input data set 106 are to be counted, the output data set 108 may include a collection of counts for each letter. In some implementations, the output data set may be updated by the pipeline 102 as the operation occurs. In some cases, the output data set 108 may be produced at the conclusion of execution of the pipeline 102. The output data set 108 may be a collection of data, such as, for example, a database table or collection of database tables, a text file, a set of key value pairs, a data stream, or other types of data.

The environment 100 also includes data store 110. The data store 110 may include one or more systems configured to organize and store data, including, but not limited to, one or more databases, one or more filesystems, a distributed database, a distributed file system, a key value store, or other types of systems. In some cases, the data store 110 may be any type of persistent storage, such that any data stored is retained until it is explicitly deleted, as opposed to non-persistent storage (e.g., random access memory) which may be cleared when it is shut down or loses power. In some cases, persistent storage may include hard drives, flash memory, or other types of media. In some implementations, the data store 110 may include one or more hardware or software processes operable to perform the operations described herein associated with the data store 110, including receiving queries for data sets 112, finding matching data sets associated with the queries, and storing data sets 112 in response to requests from pipelines.

The data store 110 includes one or more data sets 112. In operation, the pipeline objects 104a-c store the one or more data sets 112 in the data store 110. For example, the pipeline object 104a may store the data set 112 it produces as output in the data store 110, such as before, after, or concurrently with providing the data set to pipeline object 104b as input. In some cases, the data sets 112 may include the input data set 106 or the output data set 108. In some cases, each of the pipeline objects 104a-c may interact directly with the data store 110 to store data sets 112. The pipeline 102 may also interact with the data store 110 to store data sets 112.

In some implementations, the data sets 112 may include a set of key value pairs corresponding to a data set produced by one of the pipeline objects 104a-c. The data sets 112 may also be stored in a structured way defined by the data store 110, such as a table or set of tables. In some cases, the data sets 112 may be stored as files within the data store 110.

As shown, each data set 112 includes a data set name 114. In some implementations, the data set name 114 for a particular data set 112 may be specified by the particular pipeline object 104a-c, or the pipeline 102 that stores the particular data set 112 in the data store 110. In operation, the data set name 114 may be used by later running pipelines to retrieve the particular data set 112 associated with the data set name 114. In some cases, the data set name 114 may be selected to describe the particular data set 112. For example, a data set 112 including a summary of statistics for the week of May 3 may be associated with the data set name 114 "summary0503." The data set name 114 may also describe parameters used to produce the data set 112. In some implementations, the data set name 114 may be a unique identifier for the particular data set 112. The data set name 114 may be unique to the particular data store 110, or may be globally unique. In some cases, a globally unique and deterministic data set name 114 may be automatically generated for data sets.

Each data set 112 also includes metadata 116. The metadata 116 may include information about the particular data set 112, including, but not limited to, a size of the particular data set 112, a location of the particular data set 112, a format of the particular data set 112, a set of breakpoints for the particular data set 112, a key distribution for the particular data set 112, a set of file sizes for the particular data set 112, a set of execution details for the particular data set 112, parameters used to generate the particular data set 112, names of one or more input data sets used as input to the pipeline that produced the particular data set 112, descriptions of computations (and parameters for the computations) applied to the one or more input data sets to produce the particular data set 112, or other information. In some cases, the metadata 116 may be used to identify a particular data set 112 as matching a request for a data set by a later running pipeline. For example, a later running pipeline may submit a set of parameters describing a desired data set, which may be compared to the stored metadata 116 to determine if a particular data set 112 matches the request.

In some implementations, a later running pipeline may use the metadata 116 associated with a particular data set 112 to optimize its processing of a similar data set. For example, in a case for the particular data set 112 does not exactly match a request by later running pipeline, but is sufficiently related to the request, the later running pipeline may use the metadata 116 to optimize its processing. In particular, the later running pipeline may use key distribution information in the metadata 116 to determine how to split a particular data set 112 to be processed in parallel.

Figure 2:
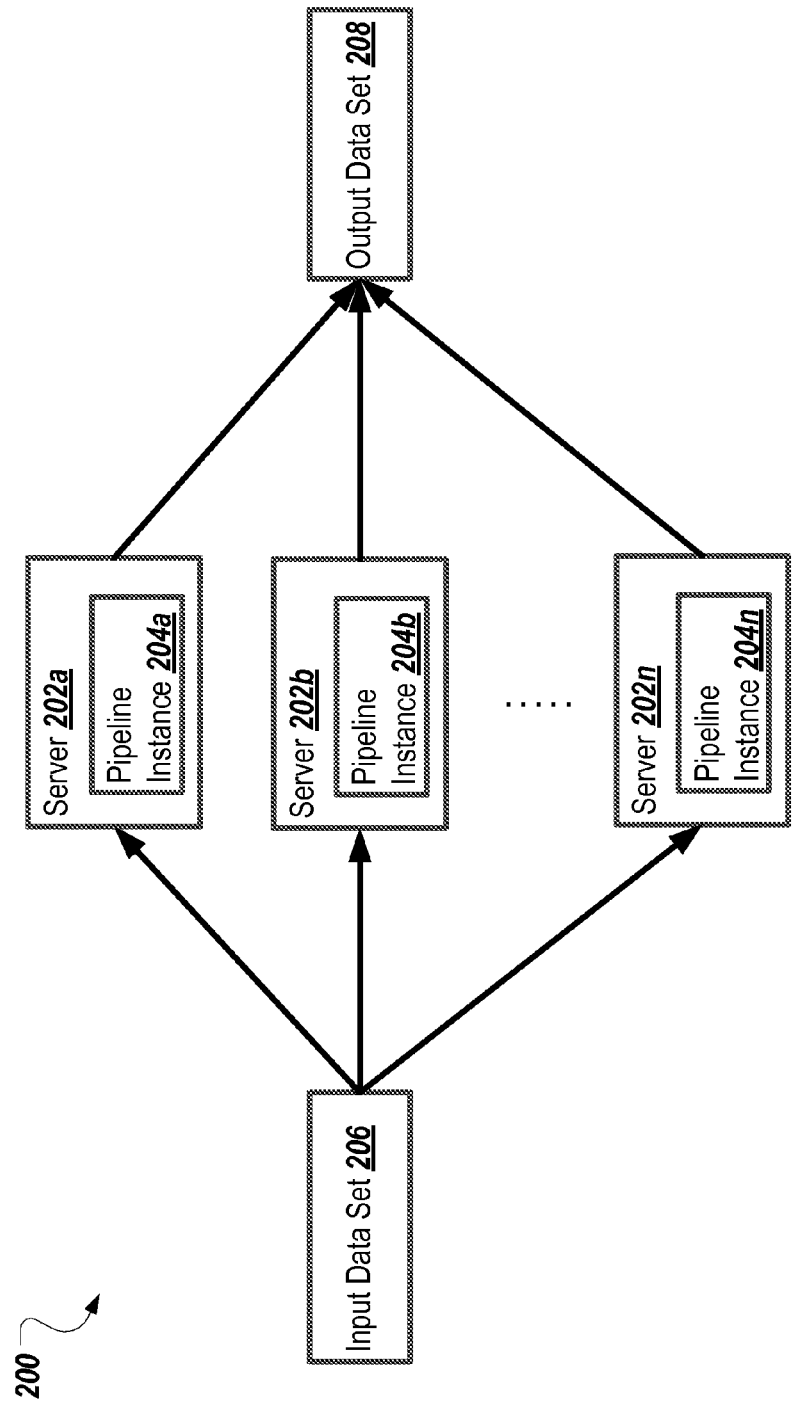
FIG. 2 is a block diagram of a system in which an input data set is processed in parallel by pipeline instances.

FIG. 2 is a block diagram of a system 200 in which an input data set 206 is processed in parallel by pipeline instances to produce an output data set 208. As shown, the system 200 includes one or more servers 202a-n each running a pipeline instance 204a-n. A pipeline instance is an executing copy of a particular pipeline. Each pipeline instance 204a-n may be identical, and may be configured to process different portions of the input data set 206. Each of the pipeline instances 204a-n execute separately from one another, such that even though the pipeline instances are identical, they are separate from one another. In some implementations, each pipeline instance 204a-n may execute across multiple of the server 202a-n. In some cases, each of the pipeline objects included in each pipeline instance 204a-n may be run on different servers. In addition, other components, such as splitters and combiners operating on input data set 206 or intermediate results produced by the pipeline instances 204a-n, may be included in the system 200.

Figure 3:
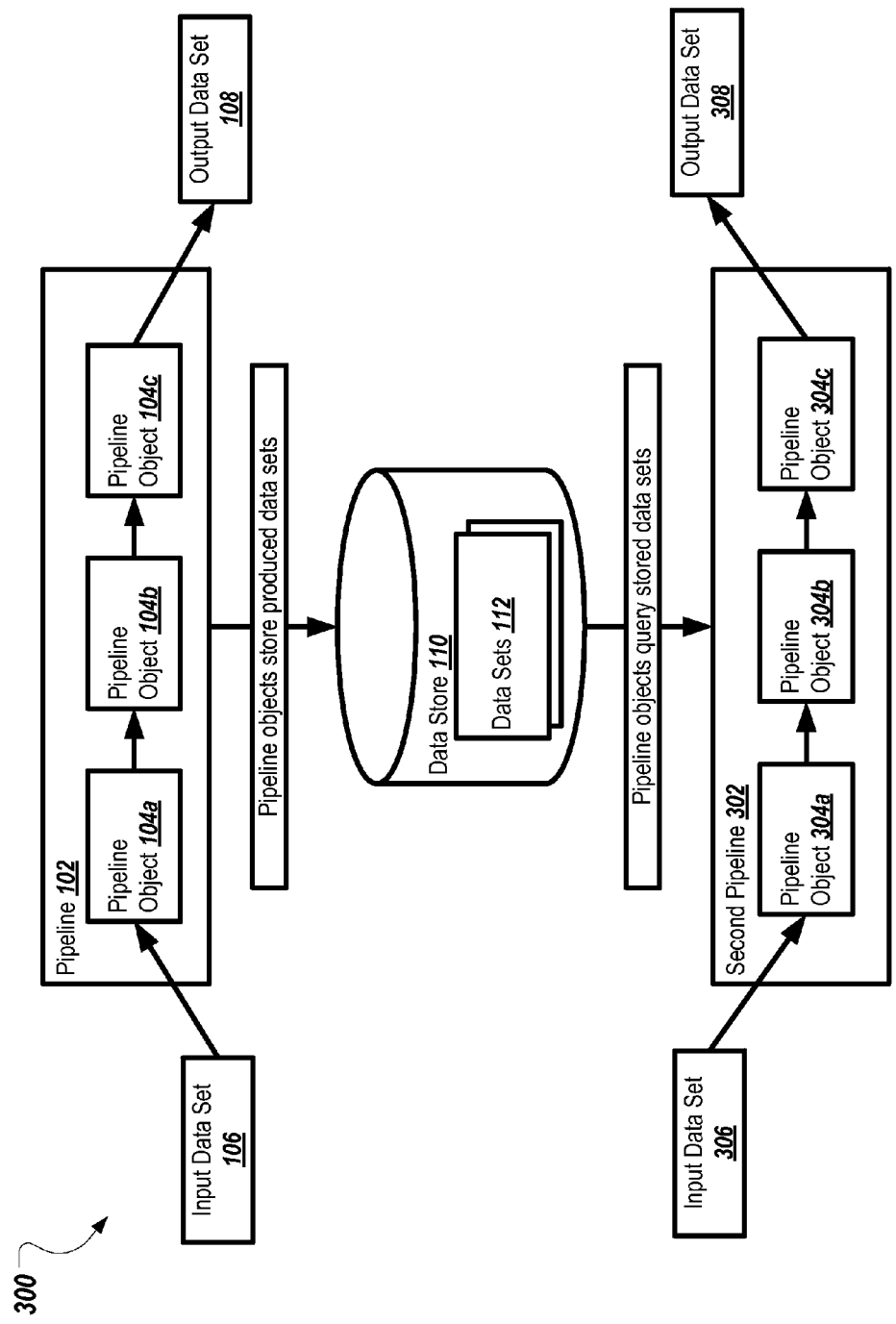
FIG. 3 is a block diagram of an environment in which pipeline objects from a first pipeline store data sets and pipeline objects from a second, later-executing pipeline query and use the stored data sets.

FIG. 3 is a block diagram of an environment in which pipeline objects 104a-c from the first pipeline 102 store data sets 112 and pipeline objects 304a-c from a second, later-executing pipeline 302 query and use the stored data sets 112. As shown, during processing of the input data set 106 to produce the output data set 108, the pipeline objects 104a-c in pipeline 102 store data sets 112 in data stored 110, as discussed in detail relative to FIG. 1.

The second pipeline 302 executes separately from the pipeline 102. In some implementations, the second pipeline 302 may be a separate instance of pipeline 102 (e.g., performing the same operations), but executing at a different time. The second pipeline 302 may also be different than the pipeline 102, such that the second pipeline 302 is an instance of a pipeline besides pipeline 102. As shown, the second pipeline 302 includes one or more pipeline objects 304a-c. The pipeline objects 304a-c may be identical, partially identical, or different than the pipeline objects 104a-c of pipeline 102. As shown, the second pipeline 302 processes and input data set 306 to produce an output data set 308. Again, the input data set 306 may be identical, partially identical, or different than the input data set 106, and the output data set 308 may be identical, partially identical, or different than the output data set 108.

In operation, the pipeline objects 304a-c query the data store 110 for data sets matching their respective output data sets. For example, pipeline object 304a may query the data store 110 at the beginning of its execution to determine whether an output one of the data sets 112 stored in the data store 110 matches the (possibly intermediate) data set to produce. The pipeline object 304a may provide information describing a requested data set to the data store 110, including, but not limited to, parameters describing the requested data set, the name of the requested data set, a type of data in the requested data set, a date range associated with the requested data set, or other information. The data store 110 may examine the one or more data sets 112 to determine if a data set matching the request exists. If so, the data store 110 may return the particular data set 112 to the pipeline object 304a in response to the request. In such a case, the pipeline object 304a may provide the particular data set 112 to pipeline object 304b as output, and may avoid performing processing associated with generating the particular data set 112. Each of the pipeline objects 304a-c may repeat this process at the beginning of execution. In some cases, the pipeline objects 304a-c may query the data store 110 for cached data sets at different times during execution, such as, for example, when a particular data set is required in a computation.

Figure 4:
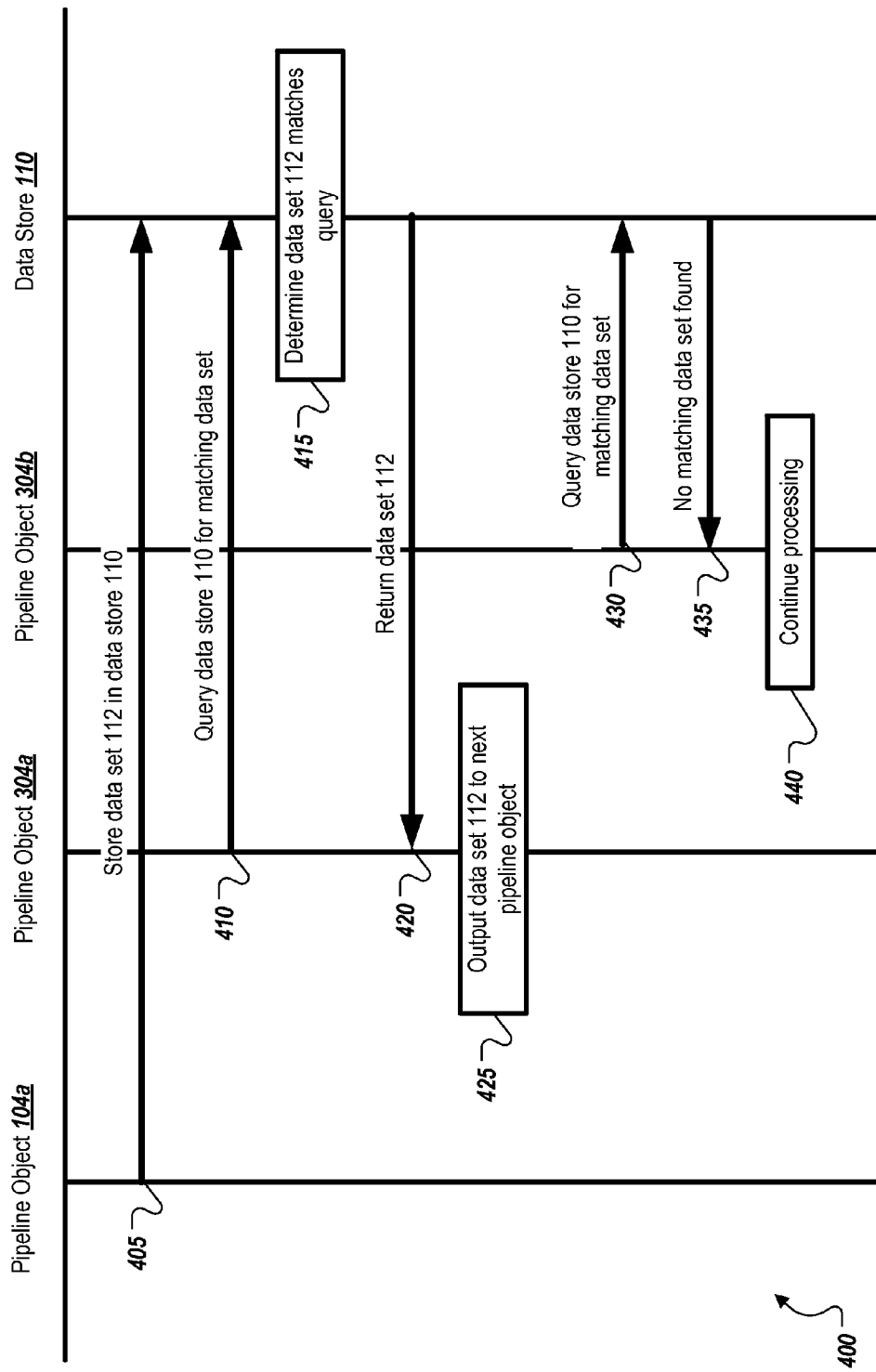
FIG. 4 is a sequence diagram of an example process for cataloging and retrieving data sets by pipeline objects.

FIG. 4 is a sequence diagram of an example process for cataloging and retrieving data sets by pipeline objects. At 405, pipeline object 104a stores data set 112 in data stored 110. Some implementations, the pipeline object 104a may interact directly with the data store 110 to store the data set 112. The pipeline object 104a may also interact with its containing pipeline 102, or another supervisory process to store the data set 112.

At 410, pipeline object 304a queries the data store 110 for a matching data set. In some cases, the pipeline object 304a may query data store 110 for a data set 112 corresponding to its particular output data set. The query may include information associated with the requested data set, such as, for example, parameters describing the requested data set, the name of the requested data set, a type of data in the requested data set, a date range associated with the requested data set, or other information. In some cases, the pipeline object 304a may specify the query to the data store 110 according to a query language, such as, for example, Structured Query Language (SQL), Lightweight Directory Access Protocol (LDAP), MultiDimensional eXpressions (MDX), or other languages.

At 415, the data store 110 determines that the data set 112 matches the query. In some cases, the data store 110 may compare the information in the query describing the requested data set to the stored data sets to determine whether a matching data set exists. The data store 110 may also identify a matching store data set based on a name specified in the query.

At 420, the data store 110 returns the data set 112 to the pipeline object 304a. In some implementations, the data store 110 may return a location for the data set 112 to the pipeline object 304a. The pipeline object 304a may, in response, retrieving the data set 112 from this location and provided to the next pipeline object. In some cases, data in the data set 112 may be sent to the pipeline object 304a from the data store 110.

At 425, the pipeline object 304a outputs the data set 112 to the next pipeline object in the pipeline (e.g., pipeline object 304b in FIG. 3). In some cases, the pipeline object 304a may provide a location of the data set 112 to the next pipeline object instead of or in addition to providing the data included in the data set 112 to the next pipeline object. By providing only the location of the data set 112 to the next pipeline object, the pipeline object 304a may avoid transferring large amounts of data from the data store 110, and then to the next pipeline object.

At 430, the pipeline object 304b queries the data store 110 for a matching data set. This action is similar to that described at 410, but may include different parameters as the pipeline object 304b may request a different data set. At 435, the data store 110 returns an indication that no matching data set was found. In response to this indication, the pipeline object 304b continues execution (440) to produce its output data set, because no store data set is available for to provide as output. In some cases, continuing execution involves the pipeline object 304b performing its associated computations to produce an output data set without using a cached data set.

Figure 5:
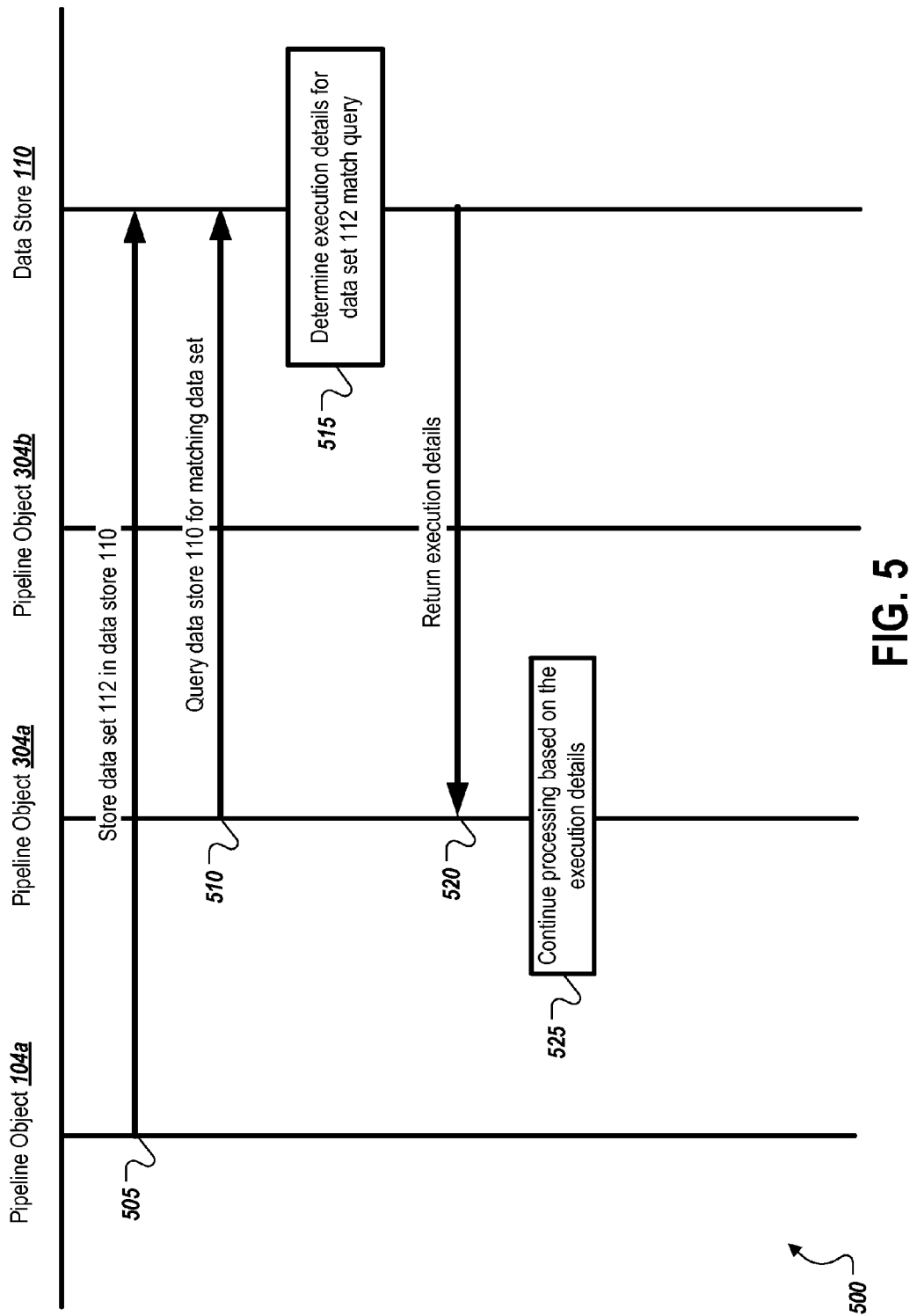
FIG. 5 is a sequence diagram of an example process of a pipeline object processing a data set based on previously stored execution details for the data set.

FIG. 5 is a sequence diagram of an example process of a pipeline object processing a data set based on previously stored execution details for the data set. At 505, the pipeline object 104a store the data set 112 in the data store 110. At 510, the pipeline object 304a queries the data store 110 for a matching data set.

A 515, the data store 110 determines that execution details for the data set 112 match the query. This may be made whether the data set 112 matches the requested data set specified by the query at 510 or not. At 520, the data store 110 returns the execution details to the pipeline object 304a.

At 525, the pipeline object 304a continues processing based on the execution details. In some cases, the pipeline object 304a may optimize its execution based on the execution details. For example, the execution details may include information about the data distribution of an input data set to be processed by the pipeline object 304a, such as, for example, a number of records, a median key length, a number of unique records, or other information. The pipeline object 304a may use this information to split the input data set for parallel processing and to configure its internal parameters (e.g. buffer sizes). In some cases, the pipeline object 304a may spawn additional instances to process the different portions of the split data set. In some cases, this execution optimization may be performed by a supervisory process rather than or in addition to the pipeline object 304a, such as the pipeline 302 or another supervisory process. In some cases, the execution details may be included in a larger parallelization plan describing how to process the data set in a distributed manner. In some implementations, the execution details may include information about the cached data set, such as key distributions or split points, that the pipeline object 304a may pass on to a next pipeline object in the pipeline 302 along with the cached data set for processing.

Figure 6:
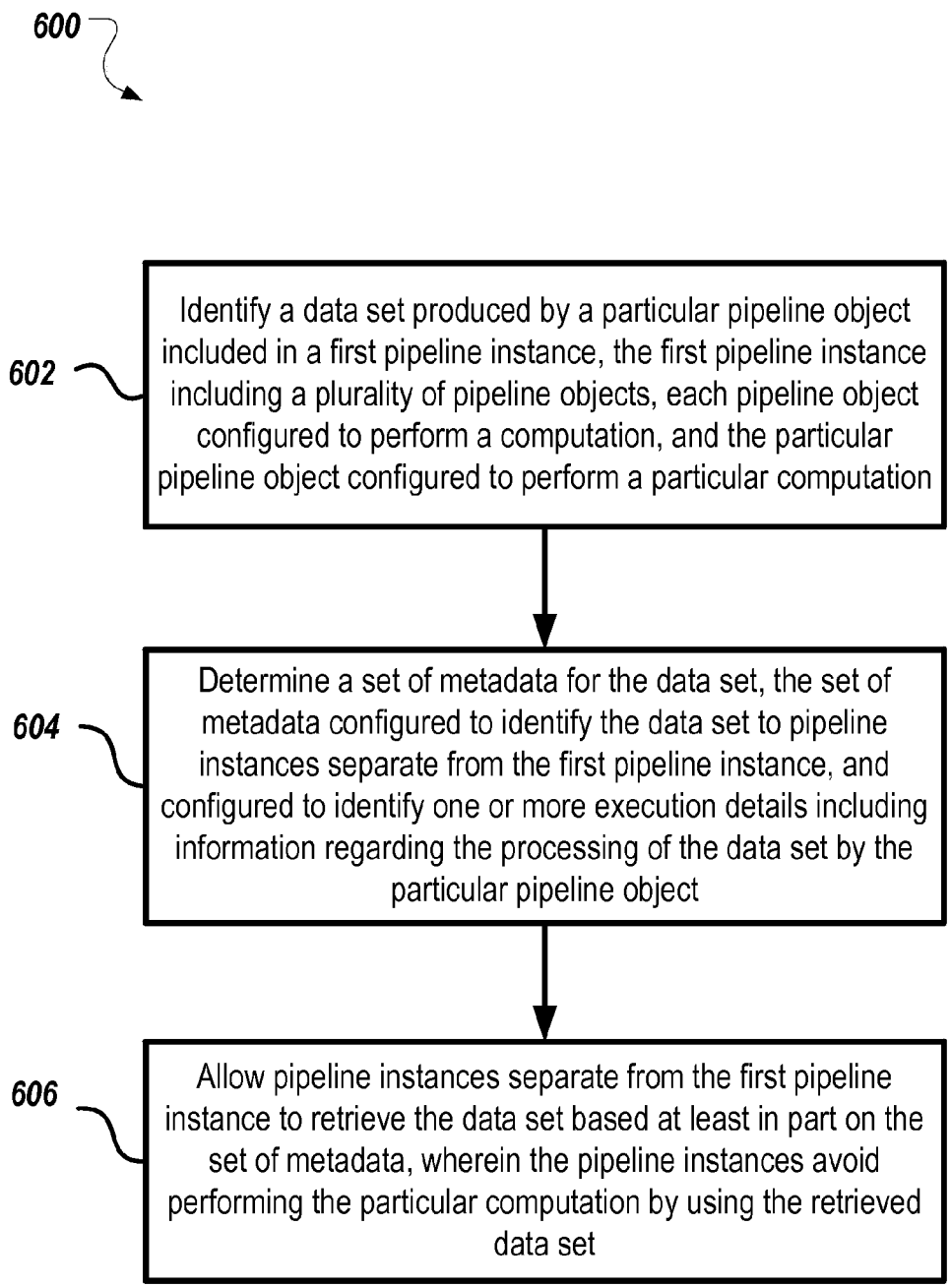
FIG. 6 is a flow diagram of an example process for cataloging data sets for reuse in pipeline applications.

FIG. 6 is a flow diagram of an example process for cataloging data sets for reuse in pipeline applications. At 602, a data set produced by a particular pipeline object in a first pipeline instance is identified. The first pipeline instance includes a plurality of pipeline objects, and each pipeline object is configured to perform a computation. The particular pipeline is configured to perform a particular computation. For example, the particular pipeline may be configured to examine all items in a particular input data set and perform a set of operations on each item to produce a corresponding output data set. In some cases, the particular pipeline may be a distributed application executing across a set of servers. The particular pipeline may be organized according to a particular programming model, such as, for example, MapReduce.

At 604, a set of metadata is determined for the data set generated from a pipeline instance. The set of metadata, once determined, identifies the data set to other pipeline instances separate from the first pipeline instance that generated the data set. The metadata also identifies one or more execution details, such as information regarding the processing of the data set by the particular pipeline object. In some cases, the metadata is used to catalog the data set, and is examined to determine whether the associated data set matches a received query. In some cases, the one or more execution details include a parallelization plan describing how to divide and distribute the data set for parallel processing. The one or more execution details may also include a list of file sizes, a list of file formats, a key distribution describing how keys within the data set were distributed to workers by the first pipeline instance, a list of key breakpoints describing how the data set was split by the first pipeline instance, or other types of information. In some cases, the set of metadata includes identifying information for the data set such date parameters, unique identifiers, query parameters, a list of file names, a time the data set was created, a list of keys, a list of key ranges, a list of split points, or other identifying information. The set of metadata may also include permission information for the data set and allowing pipeline instances separate from the first pipeline instance to retrieve the data set includes determining whether a pipeline instance has permission to retrieve the data set based on the permission information. The permission information for the data set may be specified by the first pipeline instance. In some cases, the metadata may include a unique name for the data set, and allowing pipeline instances separate from the first pipeline instance to retrieve the data set includes retrieving the data set from persistent storage based on the unique name.

At 606, pipeline instances separate from the first pipeline instance are allowed to retrieve the data set based at least in part on the set of metadata, wherein the pipeline instances avoid performing the particular computation by using the retrieve data set. For example, if the first pipeline instance stores a data set representing a set of items for a particular date, and a later running pipeline instance submits a query for the set of items for that particular date, the later running pipeline instance could use the stored set of items rather than computing them itself, thereby avoiding performing the computation.

Figure 7:
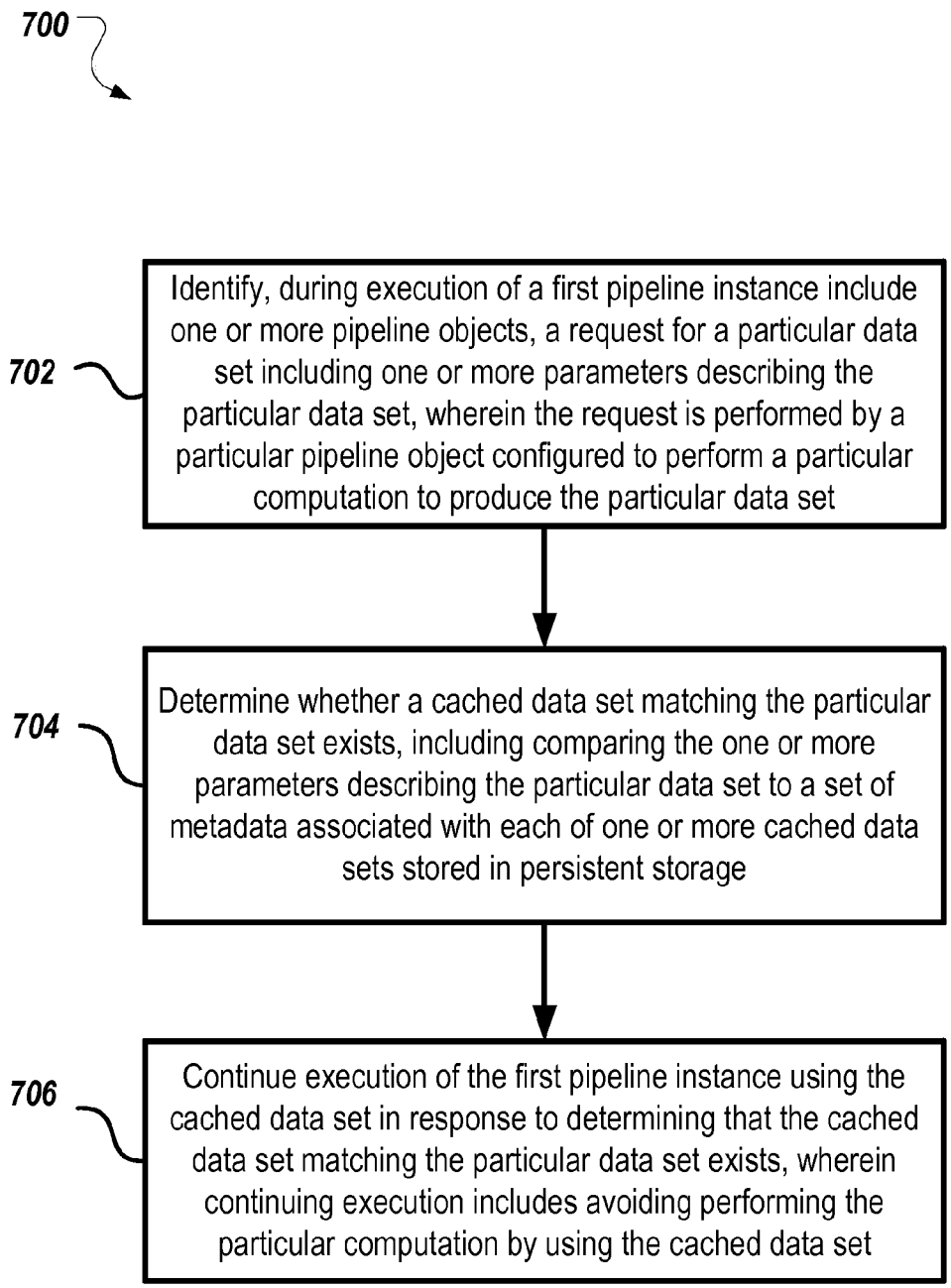
FIG. 7 is a flow diagram of another example process for retrieving catalogued data sets for reuse in pipeline applications.

FIG. 7 is a flow diagram of another example process for retrieving catalogued data sets for reuse in pipeline applications. At 702, a request for a particular data set is identified during execution of a first pipeline instance including one or more pipeline objects. The request may include one or more parameters describing the particular data set, and is performed by a particular pipeline object configured to perform particular computation to produce the particular data set. For example, the particular pipeline object may be configured to perform a computation to produce a set of all items for a particular date. Prior to the performing the computation, the particular pipeline object may submit that request for a cached data set (e.g., one previously stored) that includes the set of all items for the particular date. If such a cached data set exists, the particular pipeline object may use the cached data set rather than performing the computation to produce the data set.

At 704, a determination is made whether a cached data set matching the particular data set exists. The determination may include comparing the one or more parameters describing a particular data set to a set of metadata associated with each of the one or more cached data sets stored in persistent storage. In some cases, persistent storage may include any type of non-volatile storage that retains data until it is explicitly deleted, such as, for example, hard drives, flash memory, or other types of media. In some cases, the persistent storage may be a distributed system including one or more databases, one or more filesystems, a distributed database, a distributed file system, a key value store, or other types of systems. The cached data sets represent data sets stored by previously running pipeline instances, such as, for example, according to the process described in FIG. 6.

In some cases, determining whether the cached data set matching the particular data set exists includes determining an age of each of one or more cached data sets and determining that a particular cached data set matches the particular data set if it is within an age threshold included in the one or more parameters describing the particular data set. In some implementations, the set of metadata associated with the cached data set includes execution details for the cached data set and continuing execution of the first pipeline instance using the cached data set in response to determining that the cached data set matching the particular data set exists includes processing the cached data set based at least in part on the execution details. The execution details may include a parallelization plan describing how to divide and distribute the cached data set for parallel processing. The one or more execution details may include a list of file sizes, a list of file formats, a key distribution describing how keys within the data set were distributed to workers by the first pipeline instance, a list of key breakpoints describing how the data set was split by the first pipeline instance, or other information.

In some cases, the set of metadata includes identifying information for the cached data set such as, for example, date parameters, unique identifiers, query parameters, a list of filenames, a time the data set was created, a list of keys, a list of key ranges, or other identifying information. The set of metadata may also include permission information for the cached data set and determining whether the cached data set matching the particular data set exists includes determining whether the first pipeline instance has permission to retrieve the cached data set based on the permission information. The set of metadata may also include a unique name for the cached data set, and determining whether the cached data set matching the particular data set exists includes comparing a data set name for the particular data set to the unique name for the cached data set.

At 706, execution of the first pipeline instance is continued using the cached data set in response to determining that the cached data set matching the particular data set exists. Continuing execution may include avoiding performing the particular computation by using the cached data set.

In some cases, the particular pipeline object may perform the particular computation to produce the particular data set in response to determining that the cached data set matching the particular set does not exist or no longer exists.

In some cases, the first pipeline instance's use of the cached data set may be recorded in response to determining that the cached data set matching the particular data set exists, and a usage pattern of the cached data set may be determined based the recorded use of the cached data set by the first pipeline instance and other pipeline instances. In some cases, the usage pattern represents various aspects of usage of a cached data set, such as usage frequency, and may be used to determine which cached data sets should be retained in persistent storage and which should be removed due to non-use.

Figure 8:
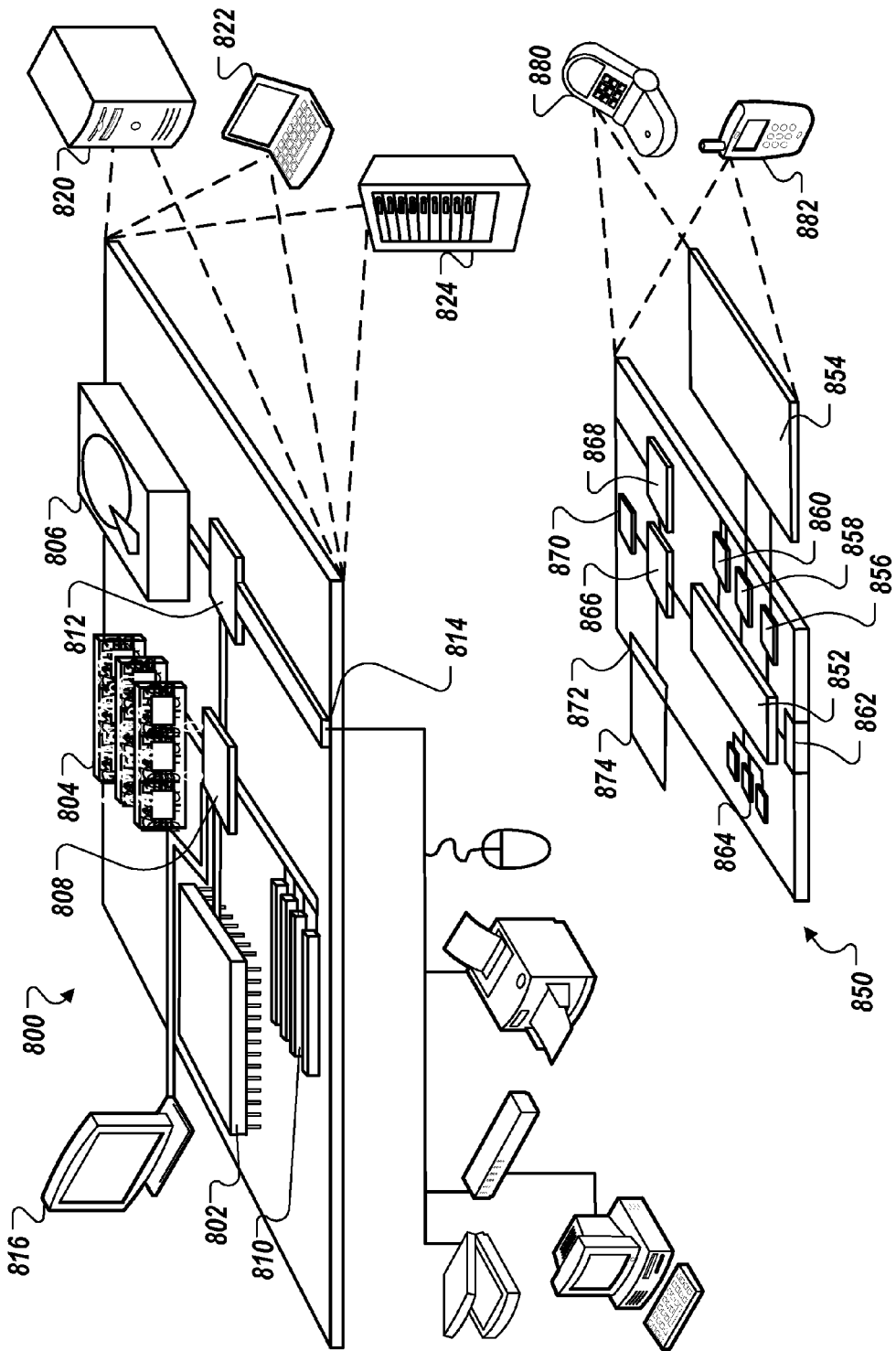
FIG. 8 is a block diagram of an example computing device.

FIG. 8 is a block diagram of computing devices 800, 850 that may be used to implement the systems and methods described in this document, as either a client or as a server or plurality of servers. Computing device 800 is intended to represent various forms of digital computers, such as laptops, desktops, workstations, personal digital assistants, servers, blade servers, mainframes, and other appropriate computers. Computing device 850 is intended to represent various forms of mobile devices, such as personal digital assistants, cellular telephones, smartphones, and other similar computing devices. Additionally computing device 800 or 850 can include Universal Serial Bus (USB) flash drives. The USB flash drives may store operating systems and other applications. The USB flash drives can include input/output components, such as a wireless transmitter or USB connector that may be inserted into a USB port of another computing device. The components shown here, their connections and relationships, and their functions, are meant to be exemplary only, and are not meant to limit implementations of the inventions described and/or claimed in this document.

Computing device 800 includes a processor 802, memory 804, a storage device 806, a high-speed interface 808 connecting to memory 804 and high-speed expansion ports 810, and a low speed interface 812 connecting to low speed bus 814 and storage device 806. Each of the components 802, 804, 806, 808, 810, and 812, are interconnected using various busses, and may be mounted on a common motherboard or in other manners as appropriate. The processor 802 can process instructions for execution within the computing device 800, including instructions stored in the memory 804 or on the storage device 806 to display graphical information for a GUI on an external input/output device, such as display 816 coupled to high speed interface 808. In other implementations, multiple processors and/or multiple buses may be used, as appropriate, along with multiple memories and types of memory. Also, multiple computing devices 800 may be connected, with each device providing portions of the necessary operations (e.g., as a server bank, a group of blade servers, or a multi-processor system).

The memory 804 stores information within the computing device 800. In one implementation, the memory 804 is a volatile memory unit or units. In another implementation, the memory 804 is a non-volatile memory unit or units. The memory 804 may also be another form of computer-readable medium, such as a magnetic or optical disk.

The storage device 806 is capable of providing mass storage for the computing device 800. In one implementation, the storage device 806 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 804, the storage device 806, or memory on processor 802.

The high speed interface 808 manages bandwidth-intensive operations for the computing device 800, while the low speed interface 812 manages lower bandwidth-intensive operations. Such allocation of functions is exemplary only. In one implementation, the high-speed interface 808 is coupled to memory 804, display 816 (e.g., through a graphics processor or accelerator), and to high-speed expansion ports 810, which may accept various expansion cards (not shown). In the implementation, low-speed interface 812 is coupled to storage device 806 and low-speed expansion port 814. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 800 may be implemented in a number of different forms, as shown in the figure. For example, it may be implemented as a standard server 820, or multiple times in a group of such servers. It may also be implemented as part of a rack server system 824. In addition, it may be implemented in a personal computer such as a laptop computer 822. Alternatively, components from computing device 800 may be combined with other components in a mobile device (not shown), such as device 850. Each of such devices may contain one or more of computing device 800, 850, and an entire system may be made up of multiple computing devices 800, 850 communicating with each other.

Computing device 850 includes a processor 852, memory 864, an input/output device such as a display 854, a communication interface 866, and a transceiver 868, among other components. The device 850 may also be provided with a storage device, such as a microdrive or other device, to provide additional storage. Each of the components 850, 852, 864, 854, 866, and 868, are interconnected using various buses, and several of the components may be mounted on a common motherboard or in other manners as appropriate.

The processor 852 can execute instructions within the computing device 850, including instructions stored in the memory 864. The processor may be implemented as a chipset of chips that include separate and multiple analog and digital processors. Additionally, the processor may be implemented using any of a number of architectures. For example, the processor 852 may be a CISC (Complex Instruction Set Computers) processor, a RISC (Reduced Instruction Set Computer) processor, or an MISC (Minimal Instruction Set Computer) processor. The processor may provide, for example, for coordination of the other components of the device 850, such as control of user interfaces, applications run by device 850, and wireless communication by device 850.

Processor 852 may communicate with a user through control interface 858 and display interface 856 coupled to a display 854. The display 854 may be, for example, a TFT (Thin-Film-Transistor Liquid Crystal Display) display or an OLED (Organic Light Emitting Diode) display, or other appropriate display technology. The display interface 856 may comprise appropriate circuitry for driving the display 854 to present graphical and other information to a user. The control interface 858 may receive commands from a user and convert them for submission to the processor 852. In addition, an external interface 862 may be provided in communication with processor 852, so as to enable near area communication of device 850 with other devices. External interface 862 may provide, for example, for wired communication in some implementations, or for wireless communication in other implementations, and multiple interfaces may also be used.

The memory 864 stores information within the computing device 850. The memory 864 can be implemented as one or more of a computer-readable medium or media, a volatile memory unit or units, or a non-volatile memory unit or units. Expansion memory 874 may also be provided and connected to device 850 through expansion interface 872, which may include, for example, a SIMM (Single In Line Memory Module) card interface. Such expansion memory 874 may provide extra storage space for device 850, or may also store applications or other information for device 850. Specifically, expansion memory 874 may include instructions to carry out or supplement the processes described above, and may include secure information also. Thus, for example, expansion memory 874 may be provided as a security module for device 850, and may be programmed with instructions that permit secure use of device 850. In addition, secure applications may be provided via the SIMM cards, along with additional information, such as placing identifying information on the SIMM card in a non-hackable manner.

The memory 864 may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 864, expansion memory 874, or memory on processor 852 that may be received, for example, over transceiver 868 or external interface 862.

Device 850 may communicate wirelessly through communication interface 866, which may include digital signal processing circuitry where necessary. Communication interface 866 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 868. In addition, short-range communication may occur, such as using a Bluetooth, WiFi, or other such transceiver (not shown). In addition, GPS (Global Positioning System) receiver module 870 may provide additional navigation- and location-related wireless data to device 850, which may be used as appropriate by applications running on device 850.

Device 850 may also communicate audibly using audio codec 860, which may receive spoken information from a user and convert it to usable digital information. Audio codec 860 may likewise generate audible sound for a user, such as through a speaker, e.g., in a handset of device 850. Such sound may include sound from voice telephone calls, may include recorded sound (e.g., voice messages, music files, etc.) and may also include sound generated by applications operating on device 850.

The computing device 850 may be implemented in a number of different forms, as shown in the figure. For example, it may be implemented as a cellular telephone 880. It may also be implemented as part of a smartphone 882, personal digital assistant, or other similar mobile device.

In various implementations, operations that are performed "in response to" or "as a consequence of" another operation (e.g., a determination or an identification) are not performed if the prior operation is unsuccessful (e.g., if the determination was not performed). Operations that are performed "automatically" are operations that are performed without user intervention (e.g., intervening user input). Features in this document that are described with conditional language may describe implementations that are optional. In some examples, "transmitting" from a first device to a second device includes the first device placing data into a network for receipt by the second device, but may not include the second device receiving the data. Conversely, "receiving" from a first device may include receiving the data from a network, but may not include the first device transmitting the data.

"Determining" by a computing system can include the computing system requesting that another device perform the determination and supply the results to the computing system. Moreover, "displaying" or "presenting" by a computing system can include the computing system sending data for causing another device to display or present the referenced information.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a readonly memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magnetooptical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magnetooptical disks; and CDROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a backend component, e.g., as a data server, or that includes a middleware component, e.g., an application server, or that includes a frontend component, e.g., a user computer having a graphical user interface or a Web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include users and servers. A user and server are generally remote from each other and typically interact through a communication network. The relationship of user and server arises by virtue of computer programs running on the respective computers and having a user-server relationship to each other. In some embodiments, a server transmits data (e.g., an HTML page) to a user device (e.g., for purposes of displaying data to and receiving user input from a user interacting with the user device). Data generated at the user device (e.g., a result of the user interaction) can be received from the user device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method executed by one or more processors, the method comprising:
   identifying a data set produced by a particular pipeline object included in a first pipeline instance, the first pipeline instance including a plurality of pipeline objects, each pipeline object configured to perform a computation, and the particular pipeline object configured to perform a particular computation;
   determining and storing a set of metadata for the data set, the set of metadata including identifying information for the data set that identifies information associated with the data set to pipeline instances separate from the first pipeline instance; and
   allowing the pipeline instances separate from the first pipeline instance to retrieve the data set based at least in part on the identifying information of the set of metadata being used to identify the data set, wherein the pipeline instances avoid performing the particular computation by using the retrieved data set, and
   wherein the set of metadata includes one or more execution details including information regarding the processing to produce the data set by the particular pipeline object.

2. The method of claim 1, wherein the one or more execution details include parallelization details describing how the data set was processed by the particular pipeline.

3. The method of claim 1, wherein the one or more execution details include at least one of: a list of file sizes in an input data set processed to produce the data set, a list of file formats in the input data set, a key distribution describing how keys within the input data set were distributed to workers by the first pipeline instance, a list of key breakpoints describing how the input data set was split by the first pipeline instance, a number of records in each portion of the input data set as split by the first pipeline instance, or an amount of time it took the first pipeline instance to process each portion of the input data set.

4. The method of claim 1, wherein the one or more execution details include at least one of a key distribution for the data set, or a set of split points for the data set.

5. The method of claim 1, wherein the identifying information for the data set includes at least one of: date parameters, unique identifiers, query parameters, a list of filenames, a time the data set was created, a list of keys, an input data set from which the data set was created, one or more computations performed to create the data set, or a list of key ranges.

6. The method of claim 1, wherein the set of metadata includes permission information for the data set and allowing pipeline instances separate from the first pipeline instance to retrieve the data set includes determining whether a pipeline instance has permission to retrieve the data set based on the permission information.

7. The method of claim 6, wherein the permission information for the data set is specified by the first pipeline instance.

8. The method of claim 1, wherein the set of metadata includes a unique name for the data set, and allowing pipeline instances separate from the first pipeline instance to retrieve the data set includes retrieving the data set from persistent storage based on the unique name.

9. A computer-implemented method executed by one or more processors, the method comprising:
- identifying, during execution of a first pipeline instance including one or more pipeline objects, a request for a particular data set, the request including one or more parameters describing the particular data set, wherein the request is performed by a particular pipeline object, included in the first pipeline instance, configured to perform a particular computation to produce the particular data set;
- determining whether a cached data set matching the particular data set exists, including comparing the one or more parameters describing the particular data set to a set of metadata associated with each of one or more cached data sets stored in persistent storage; and
- continuing execution of the first pipeline instance using the cached data set in response to determining that the cached data set matching the particular data set exists, wherein continuing execution of the first pipeline instance includes avoiding performing the particular computation by using the cached data set, and
- wherein the set of metadata associated with the cached data set includes one or more execution details for the cached data set including information regarding the processing to produce the cached data set.

10. The method of claim 9, further comprising:
- performing, by the particular pipeline object, the particular computation to produce the particular data set in response to determining that the cached data set matching the particular set does not exist.

11. The method of claim 9, wherein determining whether the cached data set matching the particular data set exists includes determining an age of an input data set processed to produce each of one or more cached data sets and determining that a particular cached data set matches the particular data set if the input data processed to produce it is within an age threshold included in the one or more parameters describing the particular data set.

12. The method of claim 9, wherein continuing execution of the first pipeline instance using the cached data set in response to determining that the cached data set matching the particular data set exists includes processing the cached data set based at least in part on the execution details.

13. The method of claim 12, wherein the execution details include a parallelization plan describing how to divide and distribute the cached data set for parallel processing.

14. The method of claim 12, wherein the one or more execution details include at least one of: a list of file sizes in an input data set processed to produce the data set, a list of file formats in the input data set, a key distribution describing how keys within the input data set were distributed to workers by the first pipeline instance, a list of key breakpoints describing how the input data set was split by the first pipeline instance, a number of records in each portion of the input data set as split by the first pipeline instance, or an amount of time it took the first pipeline instance to process each portion of the input data set.

15. The method of claim 12, wherein the one or more execution details include at least one of a key distribution for the data set, or a set of split points for the data set, and the method further comprises providing, by the particular pipeline object, the one or more execution details and the cached data set to a next pipeline object for processing.

16. The method of claim 9, wherein the set of metadata includes identifying information for the cached data set including at least one of: date parameters, unique identifiers, query parameters, a list of filenames, a time the data set was created, a list of keys, or a list of key ranges.

17. The method of claim 9, wherein the set of metadata includes permission information for the cached data set and determining whether the cached data set matching the particular data set exists includes determining whether the first pipeline instance has permission to retrieve the cached data set based on the permission information.

18. The method of claim 9, wherein the set of metadata includes a unique name for the cached data set, and determining whether the cached data set matching the particular data set exists includes comparing a data set name for the particular data set to the unique name for the cached data set.

19. A system comprising:
- memory for storing data; and
- one or more processors operable to perform operations comprising:
  - identifying a data set produced by a particular pipeline object included in a first pipeline instance, the first pipeline instance including a plurality of pipeline objects, each pipeline object configured to perform a computation, and the particular pipeline object configured to perform a particular computation;
  - determining a set of metadata for the data set, the set of metadata configured to identify the data set to pipeline instances separate from the first pipeline instance, and configured to identify one or more execution details including information regarding the processing to produce the data set by the particular pipeline object;
  - storing the data set and the set of metadata in persistent storage as a cached data set;
  - identifying, during execution of a second pipeline instance including one or more pipeline objects, specification for producing a particular data set, the specification including one or more parameters describing the particular data set, wherein the specification is included in a particular pipeline object, included in the second pipeline instance, configured to perform a particular computation to produce the particular data set;
  - determining whether the cached data set matches the particular data set, including comparing the one or more parameters describing the particular data set to the set of metadata associated with the cached data set; and
  - continuing execution of the second pipeline instance using the cached data set in response to determining that the cached data set matches the particular data set, wherein continuing execution of the second pipeline instance includes avoiding performing the particular computation by using the cached data set.

* * * * *